(No Model.)

E. M. HEAFER.
Flood Gate for Tile Drains.

No. 233,853. Patented Nov. 2, 1880.

Witnesses
Fred G. Dieterich
B. L. Dieterich

Inventor
Edgar M. Heafer
by DeWitt C. Allen
Attorney

United States Patent Office.

EDGAR M. HEAFER, OF BLOOMINGTON, ILLINOIS.

FLOOD-GATE FOR TILE DRAINS.

SPECIFICATION forming part of Letters Patent No. 233,853, dated November 2, 1880.

Application filed June 7, 1880. (No model.)

*To all whom it may concern:*

Be it known that I, EDGAR M. HEAFER, of Bloomington, in the county of McLean, and in the State of Illinois, have invented certain new and useful Improvements in Flood-Gates for Tile Drains; and I do hereby declare that the following is a full, clear, and exact description thereof, reference being had to the accompanying drawings, and to the letters of reference marked thereon, making a part of this specification, and in which—

Figure 1:
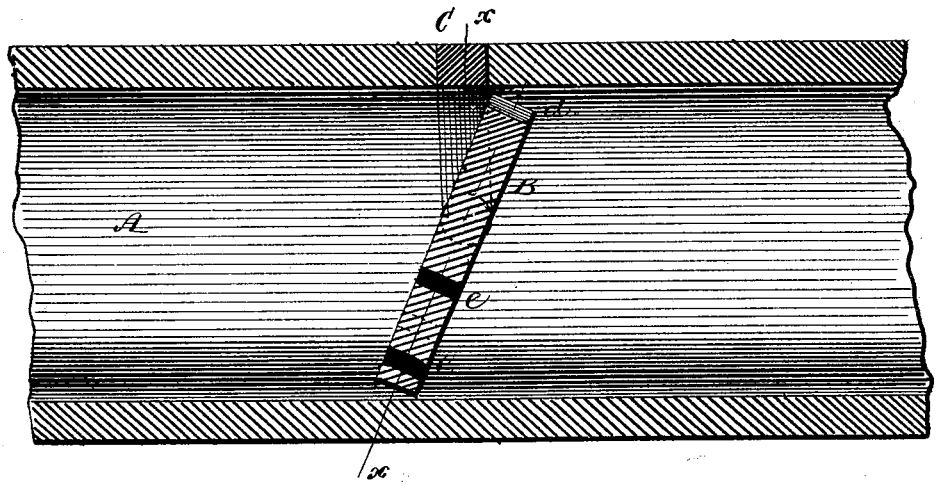
Figure 2:
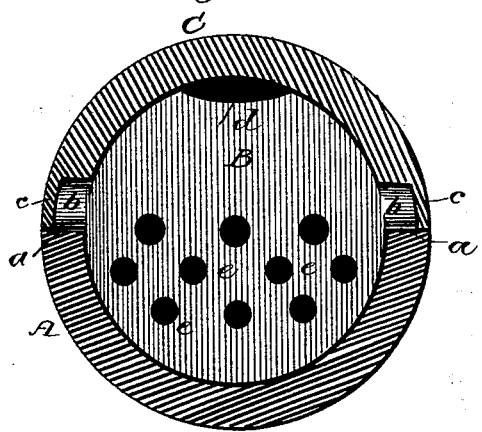

Figure 1 represents a longitudinal vertical section of my improvements as applied to a drain-tile; Fig. 2, cross-section through line $x$ $x$ of Fig. 1.

My invention relates to certain new and useful improvements in flood gates or traps for tile drains, more especially designed for preventing or providing a barrier to the entrance of animals into tile ditches, while at the same time presenting no obstruction to the outward flow of water; and to this end the invention consists, essentially, in the combination, with an earthen drain-tile, of an interior gate or trap having journals and formed of the same material; and the invention further consists in novel constructions and combinations of parts, all as will be hereinafter fully described, and specifically pointed out in the claims.

In the drawings, A represents a section of an earthen drain-tile, and B an interior gate or trap, having suitable journals, $b$ $b$, adapted to rest in bearings formed in the interior sides of the tiling A.

The gate or trap is made of clay or other suitable earth, and may be molded in molds or pressed through dies, or made in any other convenient manner, and glazed or left unglazed, as may be deemed expedient.

The opening $d$ at the top of the gate or trap is designed for the passage of air, and may be of any size, not sufficient, however, for rats or other animals passing through it. It may also have perforations $e$ below the journals for the passage of air, experience having demonstrated that the passage of air is necessary.

Provision is made for hanging the gate or trap by cutting a half-circle (more or less) out of the tile, leaving edges at the base of the opening thus made, which form the interior bearings, $a$ $a$, for the journals of the gate or trap.

The part of the half-circle or semicircular portion C of the drain-tile thus taken out may have shoulders $c$ $c$ formed at the ends, which shall meet the journals of the gate or trap when reinserted and prevent the pressure of the water from raising the journals off their bearings. This same portion C answers a further purpose of keeping out dirt; but this portion C may be left out altogether, if deemed expedient, and other means employed, both to prevent the falling in of dirt and the raising of the journals of the gate or trap.

The gate or trap should hang in an oblique line with reference to the tile, readily rising when the water strikes it from within, and resisting the attempted ingresses of animals by bracing the lower end against the bottom surface of the tile, in which case it cannot move or swing inward unless the journals should rise, (which is provided against as above described,) inasmuch as the lower radius of the gate or trap, if swung, would describe a larger circle than that of the tile wherein the gate or trap is hung.

The advantages of a clay or earthen gate are manifest. It can be manufactured by a cheap process, while the material employed is comparatively inexpensive, and, furthermore, producing a more durable gate or trap, while obviating the defects incident in the use of metallic gates or traps.

Having thus fully described my invention, I claim as new—

1. A tile gate or trap which, with its journals, is formed entirely of clay or other suitable earth, substantially as herein shown and described.

2. The tile A, having a semicircular or partially circular opening for the insertion of a gate or trap, with bearings $a$ $a$ for the gate or trap, substantially as and for the purpose herein shown and described.

3. The tile A, having a semicircular or partially circular opening, with bearings $a$ $a$, and semicircular portion C, having shoulders $c$ $c$ at its ends, in combination with a gate or trap having suitable journals, substantially as and for the purpose herein shown and described.

4. The combination of an earthen drain-tile and interior gate or trap formed of the same material, substantially as and for the purpose herein shown and described.

In testimony that I claim the foregoing I have hereunto set my hand this 15th day of May, 1880.

EDGAR M. HEAFER.

Witnesses:
 H. E. HADLEY,
 THOS. SLADE.